United States Patent
Freed et al.

(10) Patent No.: US 10,489,442 B2
(45) Date of Patent: Nov. 26, 2019

(54) IDENTIFYING RELATED INFORMATION IN DISSIMILAR DATA

(71) Applicant: International Business Machines Corporation, Armonk, NY (US)

(72) Inventors: Andrew R. Freed, Cary, NC (US); Ahmed M. Nassar, Katy, TX (US); Eman Omar, Katy, TX (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 937 days.

(21) Appl. No.: 14/599,656

(22) Filed: Jan. 19, 2015

(65) Prior Publication Data

US 2016/0210314 A1    Jul. 21, 2016

(51) Int. Cl.
*G06F 16/36*    (2019.01)
*G06F 16/21*    (2019.01)
*G06F 16/33*    (2019.01)

(52) U.S. Cl.
CPC ............ *G06F 16/36* (2019.01); *G06F 16/21* (2019.01); *G06F 16/3344* (2019.01); *G06F 16/367* (2019.01); *G06F 16/374* (2019.01)

(58) Field of Classification Search
CPC ......... G06F 17/30289; G06F 17/30684; G06F 16/36; G06F 16/367; G06F 16/374
See application file for complete search history.

(56) References Cited

U.S. PATENT DOCUMENTS

| | | | | |
|---|---|---|---|---|
| 8,359,193 | B2 * | 1/2013 | Chen | G06F 17/2785 704/270 |
| 9,110,882 | B2 * | 8/2015 | Overell | G06F 17/278 |
| 9,600,566 | B2 * | 3/2017 | Ganti | G06F 17/2795 |
| 2003/0018668 | A1 * | 1/2003 | Britton | G06F 17/241 715/230 |
| 2003/0233224 | A1 * | 12/2003 | Marchisio | G06F 17/271 704/4 |
| 2004/0117189 | A1 * | 6/2004 | Bennett | G06F 17/27 704/270.1 |

(Continued)

OTHER PUBLICATIONS

IBM; Non-Destructive Annotation of Documents in an Image Processing Environment, Jun. 19, 2003.

(Continued)

*Primary Examiner* — William Spieler
(74) *Attorney, Agent, or Firm* — Garg Law Firm, PLLC; Rakesh Garg; James Nock

(57) ABSTRACT

A method, system, and computer program product for identifying related information in dissimilar data are provided in the illustrative embodiments. Using a first part of a first entry in a dictionary, a first portion is identified in a first data, the first part matching the first portion within a tolerance. A second part of the first entry referencing a section of a second data is determined, the second data being organized in a repository according to a schema. A third part of the first entry sufficient to locate a record in the section of the second data is determined. A query is constructed using the second part and the third part, and performed on the second data. A result set is obtained, wherein a record in the result set is related to the first portion in the first data and the record does not include the first portion.

12 Claims, 6 Drawing Sheets

(56) References Cited

U.S. PATENT DOCUMENTS

| | | | | |
|---|---|---|---|---|
| 2007/0143273 | A1* | 6/2007 | Knaus | G06F 17/30616 |
| 2009/0019356 | A1* | 1/2009 | Deyab | G06F 17/241 |
| | | | | 715/231 |
| 2011/0307435 | A1* | 12/2011 | Overell | G06F 17/278 |
| | | | | 706/46 |
| 2013/0275459 | A1* | 10/2013 | Oka | G06F 17/30424 |
| | | | | 707/769 |
| 2014/0143257 | A1 | 5/2014 | Bartholomew | |
| 2014/0280314 | A1* | 9/2014 | Coleman | G06F 17/30587 |
| | | | | 707/769 |
| 2015/0356463 | A1* | 12/2015 | Overell | G06F 17/278 |
| | | | | 706/12 |
| 2016/0132572 | A1* | 5/2016 | Chang | G06F 17/30569 |
| | | | | 707/723 |
| 2016/0132590 | A1* | 5/2016 | Byron | G06F 17/30675 |
| | | | | 707/734 |
| 2016/0171094 | A1* | 6/2016 | Byron | G06F 17/30675 |
| | | | | 707/734 |

OTHER PUBLICATIONS

Internet Society RFCS et al; A Reputation Query Protocol, Nov. 23, 2013.
Wikipedia, Text annotation, From Wikipedia, the free encyclopedia, http://en.wikipedia.org/wiki/Text_annotation, Sep. 21, 2014.
Oil and Gas Journal, More Attention Recommended for Global Deep Reservoirs, 2013.

* cited by examiner

FIG. 4

Distribution by basin type

Of the seven regions in the worldwide assessment, North America, excluding the US onshore Lower 48, contains the largest quantities of the discovered original 2P reserves of deep oil, gas and condensate (28.06 million boe).

Furthermore, North America is also the most prolific region for deep oil reserves (20.225 Million bbl) with the bulk found in the deepwater and ultra deepwater Gulf of Mexico. The Middle East has the largest share of deep gas (96,701 bcf) and condensate reserves (3.881 Billion bbl) with the Arabian Basin Constraining 56% of the deep gas.
402

The distribution of the 87 sedimentary basins with deep petroleum accumulations in the world is shown in Fig. 1. The pie size represents the quantities of deep oil, gas, and condensate original 2P reserves of the 48 more prolific deep basins, each of which contains an original 2P petroleum reserve of more than 50 million boe.

The tree most prolific basins for deep petroleum are the Gulf of Mexico (27.593 million boe), Arabian (15.192 million boe), and East Venezuela basins (11.521 million boe), and together they host 48.6% of the world total. The maximum burial depth of deep petroleum reservoirs is 32,808 ft (about 10,000 m), which is recorded in the Gulf of Mexico basin.
406A     404     406     408

In this study, we classified the 87 deep sedimentary basins into seven widely used types: Continental rift, Passive margin, intracratonic, foreland, forearc, backarc, and strike-slip. The classification schema is the simplification of the basin categories of Ingersoll and Busby.
414

Passive margin and foreland basins are the interpreted types for 66 of the 87 deep basins, with the rift basins of 12. Passive margin and foreland basins contain the bulk of the world total, with the former accounting for 47.7% and the latter 46.4%.
410     412

IDENTIFYING RELATED INFORMATION IN DISSIMILAR DATA

TECHNICAL FIELD

The present invention relates generally to a method, system, and computer program product for correlating and finding information. More particularly, the present invention relates to a method, system, and computer program product for identifying related information in dissimilar data.

BACKGROUND

Enormous amount of data is created everyday and the total volume of data that is available at any given time is ever increasing. For example, presently, approximately 2.5 Quintillion bytes of data is created every day.

A person or entity (collectively hereinafter, "user") may be interested in a fraction of this volume of data according to the user's interest, field of study, importance to a business, and other reasons. Even this fraction of the total volume is unmanageable. The data is this fraction is still too voluminous to process or consume adequately, relate it with other data available to the user, and use it beneficially.

SUMMARY

The illustrative embodiments provide a method, system, and computer program product for identifying related information in dissimilar data. An embodiment includes a method for identifying related information in dissimilar data. The embodiment identifies, using a first part of a first entry in a dictionary, a first portion in a first data, the first part matching the first portion within a tolerance. The embodiment determines a second part of the first entry in the dictionary, the second part referencing a section of a second data, the second data being organized in a repository according to a schema. The embodiment determines a third part of the first entry in the dictionary, the third part being sufficient to locate a record in the section of the second data. The embodiment constructs a query using the second part and the third part. The embodiment obtains, responsive to performing the query on the second data, a result set, wherein a record in the result set is related to the first portion in the first data and the record does not include the first portion.

Another embodiment includes a computer program product for identifying related information in dissimilar data. The embodiment further includes one or more computer-readable tangible storage devices. The embodiment further includes program instructions, stored on at least one of the one or more storage devices, to identify, using a first part of a first entry in a dictionary, a first portion in a first data, the first part matching the first portion within a tolerance. The embodiment further includes program instructions, stored on at least one of the one or more storage devices, to determine a second part of the first entry in the dictionary, the second part referencing a section of a second data, the second data being organized in a repository according to a schema. The embodiment further includes program instructions, stored on at least one of the one or more storage devices, to determine a third part of the first entry in the dictionary, the third part being sufficient to locate a record in the section of the second data. The embodiment further includes program instructions, stored on at least one of the one or more storage devices, to construct a query using the second part and the third part. The embodiment further includes program instructions, stored on at least one of the one or more storage devices, to obtain, responsive to performing the query on the second data, a result set, wherein a record in the result set is related to the first portion in the first data and the record does not include the first portion.

Another embodiment includes a computer system for identifying related information in dissimilar data. The embodiment further includes one or more processors, one or more computer-readable memories and one or more computer-readable storage devices. The embodiment further includes program instructions, stored on at least one of the one or more storage devices for execution by at least one of the one or more processors via at least one of the one or more memories, to identify, using a first part of a first entry in a dictionary, a first portion in a first data, the first part matching the first portion within a tolerance. The embodiment further includes program instructions, stored on at least one of the one or more storage devices for execution by at least one of the one or more processors via at least one of the one or more memories, to determine a second part of the first entry in the dictionary, the second part referencing a section of a second data, the second data being organized in a repository according to a schema. The embodiment further includes program instructions, stored on at least one of the one or more storage devices for execution by at least one of the one or more processors via at least one of the one or more memories, to determine a third part of the first entry in the dictionary, the third part being sufficient to locate a record in the section of the second data. The embodiment further includes program instructions, stored on at least one of the one or more storage devices for execution by at least one of the one or more processors via at least one of the one or more memories, to construct a query using the second part and the third part. The embodiment further includes program instructions, stored on at least one of the one or more storage devices for execution by at least one of the one or more processors via at least one of the one or more memories, to obtain, responsive to performing the query on the second data, a result set, wherein a record in the result set is related to the first portion in the first data and the record does not include the first portion.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts an example of a volume of data and annotation therein in accordance with an illustrative embodiment;

DETAILED DESCRIPTION

Figure 1:
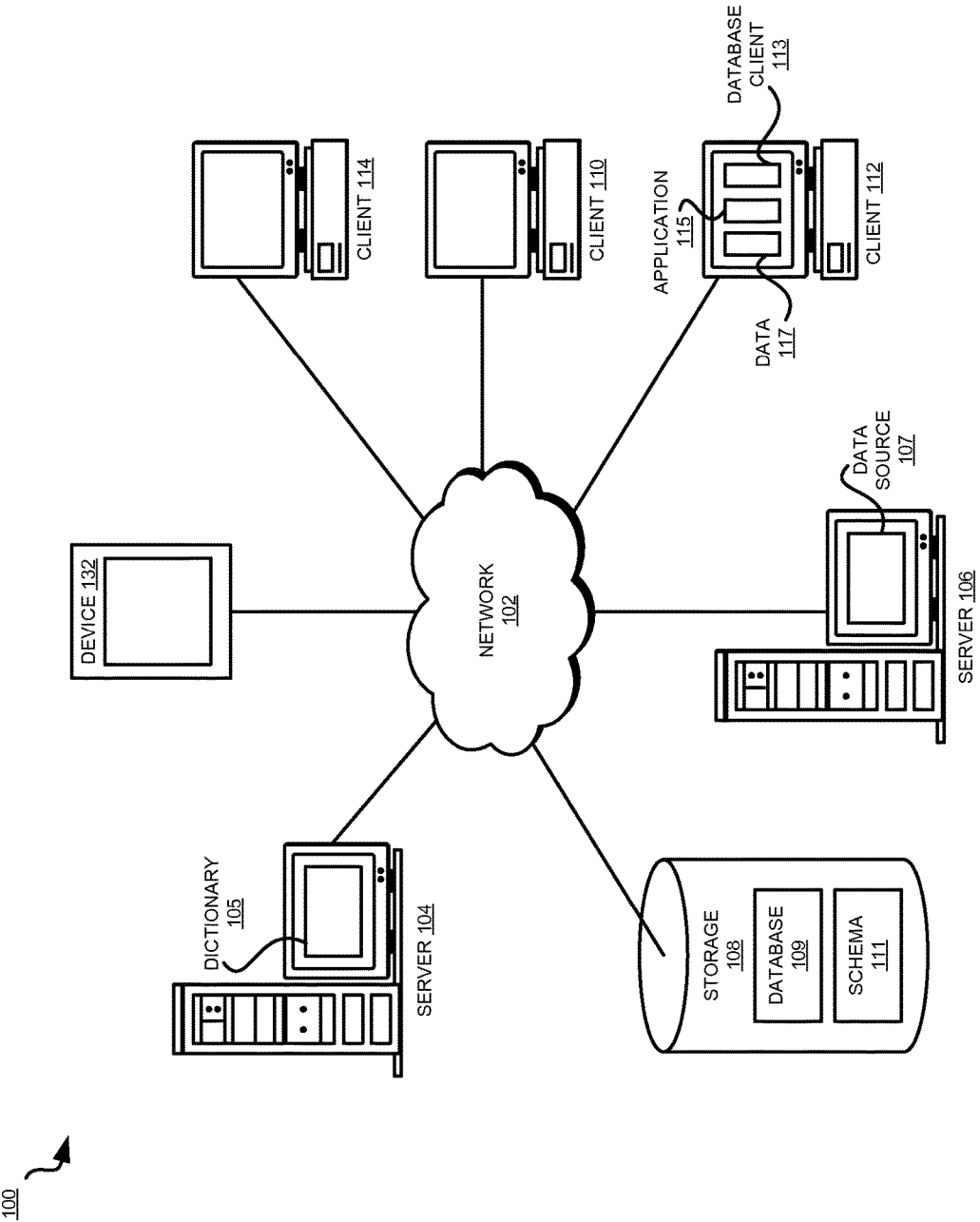
FIG. 1 depicts a block diagram of a network of data processing systems in which illustrative embodiments may be implemented.

Users maintain information about their business or interest in databases. For example, an entity engaged in the business of oil and gas exploration maintains the information about their projects in a database, organized by project numbers and other such proprietary or business-specific information or concepts.

Besides being too voluminous to adequately process and user, the data available to the user often presented in significantly different form. For example, a news article in a publication or a research paper often makes references to similar information about an oil reservoir in vastly different ways. As a simple example, an article may reference a reservoir in the Arabian basin as a reservoir in the Middle East, a research paper may refer to the same reservoir as a reservoir in the North African region, and a database of an oil and gas exploration company may reference the reservoir in another different manner.

The illustrative embodiments recognize that presently, the task of consuming the available data, relating the data to other information, and finding a usefulness of the data is largely performed by humans in a manual manner. The illustrative embodiments recognize that presently, a technological solution is not available to automatically consume available data, relate the data to other information, and extract useful or meaningful relationships between the two to enable a decision making process.

The illustrative embodiments used to describe the invention generally address and solve the above-described problems and other problems related to consuming diversely presented volumes of data. The illustrative embodiments provide a method, system, and computer program product for identifying related information in dissimilar data.

In the description of the illustrative embodiments, a database is used for storing a user's information and a query of a certain type is used to extract information from that database only as an example. Other forms of data storage and their corresponding manners of querying are contemplated within the scope of the illustrative embodiments.

Furthermore, the illustrative embodiments are described using an oil and gas exploration entity as an example user only for the clarity of the embodiments and not as a limitation on the illustrative embodiments. Accordingly, the example data used by the example user from the generally available volume of data, the example information in the example user's database are also non-limiting examples. From this disclosure, those of ordinary skill in the art will be able to adapt an embodiment for use with other data, other information, other organization of the information, other manners of querying or extracting the information from that organization, and the same are contemplated within the scope of the illustrative embodiments.

An embodiment maintains or manages a repository of keywords and their corresponding related concepts in the user's information. The keywords are hereinafter also referred to interchangeably as keys. The repository of the key-concept entries is called a dictionary. The dictionary can be a general dictionary or a subject-matter-specific dictionary. For example, the example oil and gas exploration entity may maintain a domain-specific dictionary that includes words expected to be found in oil and gas industry related volume of data. In such a dictionary, and embodiment relates the words expected to be found in oil and gas industry related volume of data with how similar concepts are represented in the entity's database schema. The representation of a concept in a database schema is called a normalized form.

For example, assume that the data is an article describing some information about oil and gas reservoirs in the Arabian basin. The entity may want to use the research paper to make a decision with respect to their operations in that region.

The word "Arabian" can be a key in the dictionary that is related to an entry in a row of a table in a database schema. For example, the key "Arabian" may be related to a row entry "North Africa" or a row entry containing a project code for a project that the entity has in that region. The row entry is an example of a normalized form related to the key. Any number of row entries from the entity database can similarly be associated with the key "Arabian", such as when the entity calls that region by different names, or has several different projects in the region.

Furthermore, the word "Arabian" may be a key in the dictionary that is related to a column name of a column in a database schema. For example, the "Arabian" key may be related to column name "Region" or another column name describing the manner in which the entity classifies projects according to geography, such as "zones" or "country". The column name is an example of a type of information related to the key. The column name can be another example of a normalized form related to the key. Any number of column names from the entity database can similarly be associated with the key "Arabian".

An embodiment enables the management of such a dictionary. For example, the dictionary may initially have been created manually with a few entries, and the embodiment adds, removes, augments, enhances, or otherwise modifies the entries therein over time according to the volume of data used and consumed by one or more illustrative embodiments.

When certain data is available from a volume of data, such as a news article, an embodiment uses such a dictionary to locate the keys in the data. Using a combination of one or more keys located in the data, the embodiment determines their normalized forms.

An embodiment further constructs a query for the entity's database using the normalized forms. For example, if the database is a relational database, the embodiment constructs a Structured Query Language (SQL) query that uses one or more normalized forms in one or more clauses of the query.

An embodiment executes the query, or causes the query to be executed on the entity's database, whose schema is used for managing the dictionary. The database returns a result set, which includes one or more database records.

A database record is selected in the result set because the query used a normalized form that matched the record regardless of how the published article. Thus, an embodiment is able to relate the data of the published article to the information in the user's database, even though the data of the article contains descriptions and items not found in the user's database of information.

A method of an embodiment described herein, when implemented to execute on a device or data processing system, comprises substantial advancement of the functionality of that device or data processing system in relating diverse volumes of data with information in a database. For example, where prior-art fails to recognize the relationship between descriptions and items in one volume of data with descriptions and items in another repository of information, an embodiment uses a dictionary to determine how certain descriptions in the volume of data are related to certain contents of the repository. Furthermore, an embodiment also produces results from the repository, which appear to be related to the descriptions in the volume. Operating in a manner described herein, an embodiment allows a user to make decisions relative to the information in the repository based on the data available in the volume. Such manner of automatic analysis and correlation of diverse and dissimilar data is unavailable in presently available devices or data processing systems. Thus, a substantial advancement of such devices or data processing systems by executing a method of an embodiment allows a user or a decision making process to act upon the related records in the user's repository based on the descriptions in the volume of data, which a user would otherwise have to relate manually, thereby limiting the amount of data that the user can meaningfully consume or use from the volume.

The illustrative embodiments are described with respect to certain data or information, sources and repositories, databases and query types, keys and normalized forms, result sets, dictionaries, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
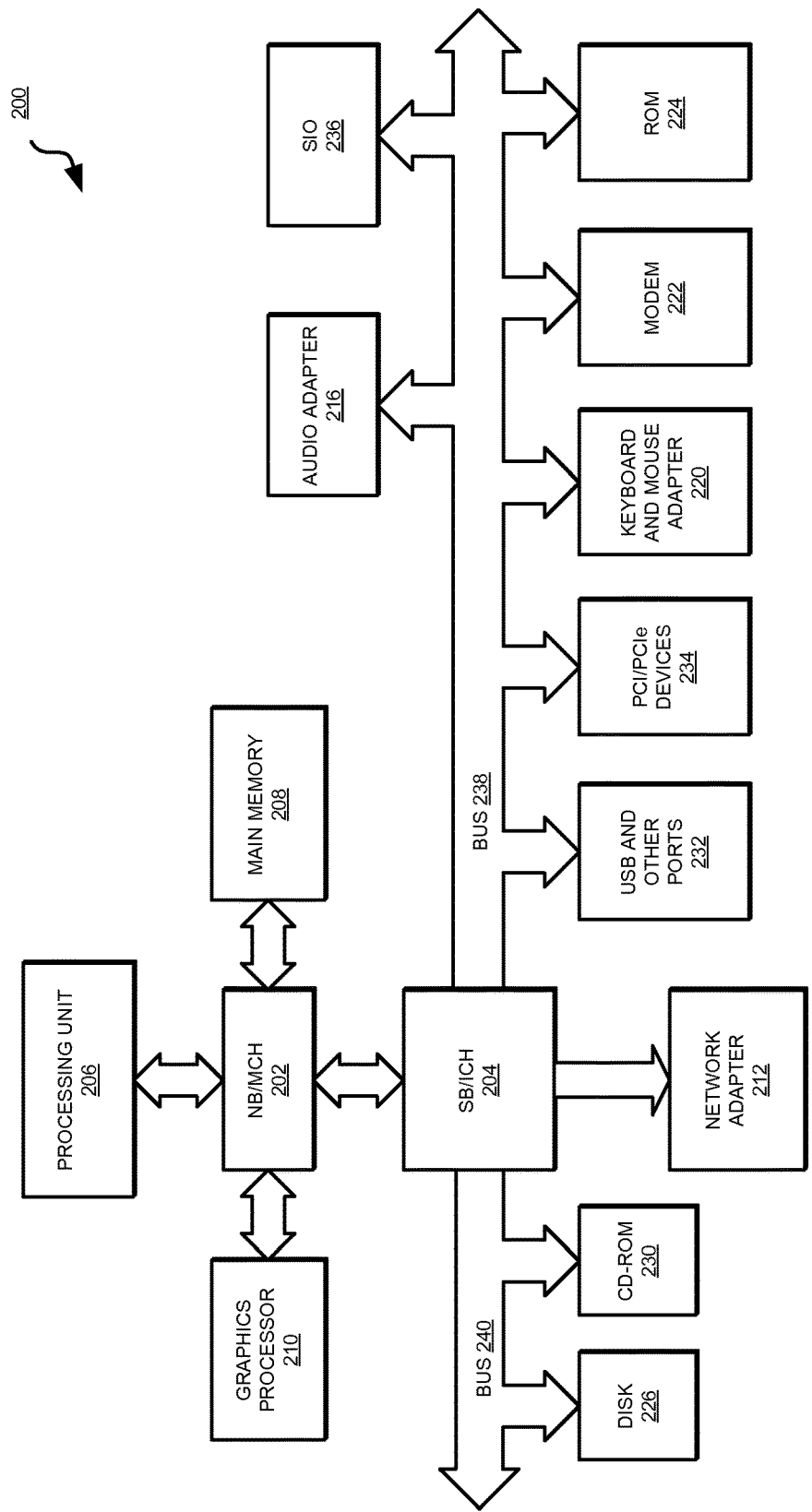
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a mobile device and is usable for executing an implementation of an embodiment, such as a version of application 115 that is configured in a manner suitable for execution on device 132. For example, device 132 can take the form of a smartphone, a tablet computer, a laptop computer, client 110 in a stationary or a portable form, a wearable computing device, or any other similarly purposed device. Application 115 in client 112 implements an embodiment described herein. Application 115 operates in conjunction with database client 113. Client 113 is any application that is configured to submit a query, such as a query constructed by application 115, to a database server (not shown), to execute on database 109. Database 109 comprises a repository of information according to schema 111 as described elsewhere in this disclosure. Data source 107 supplied data 117. Data 117 is an example of a volume of data as described elsewhere. Application 115 manages dictionary 105. Application 105 uses dictionary 105 to analyze data 117, forms a query, submit the query to database client 113, for extracting a result set (not shown) from database 109 where the records in the result set are related to the descriptions contained in data 117 even when database 109 does not include all or portions of those descriptions.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 115 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
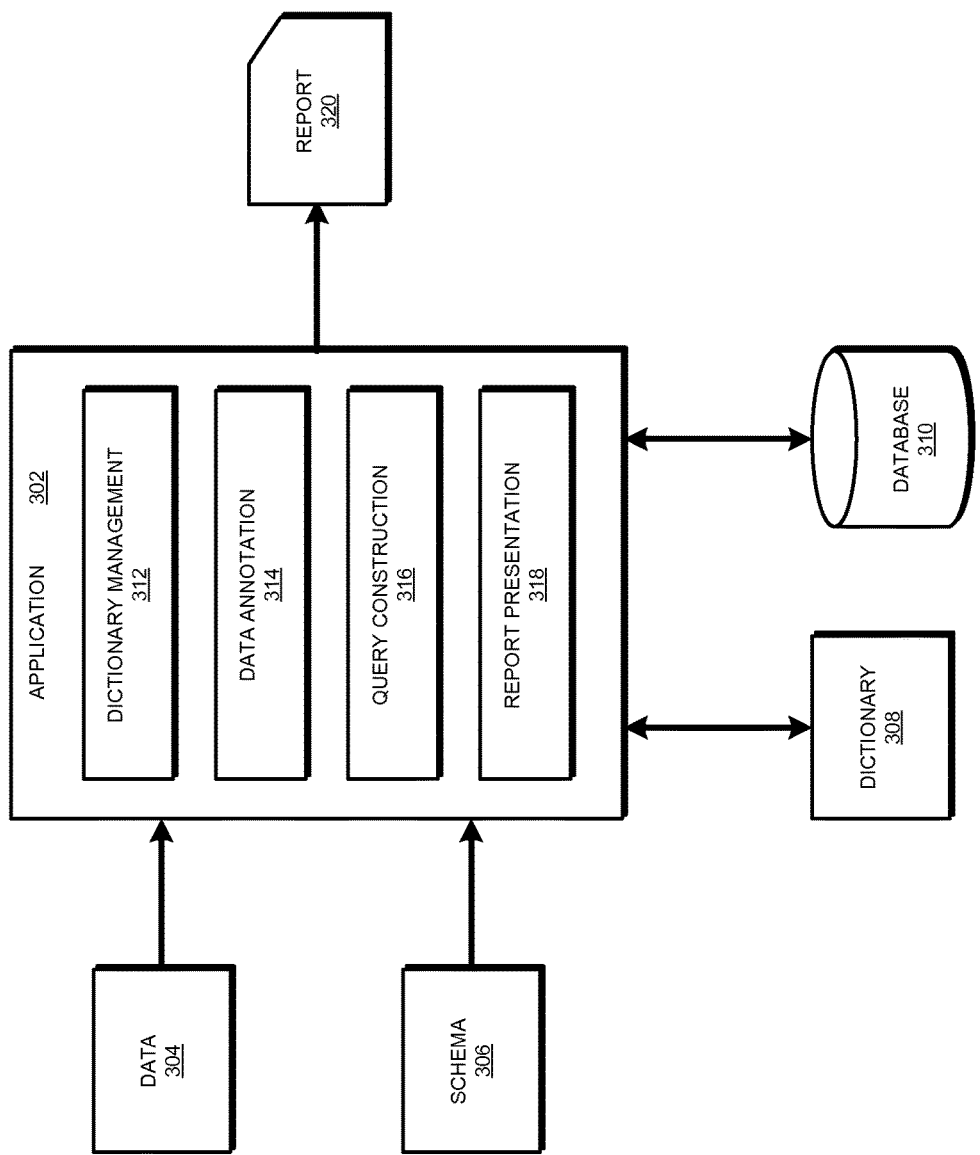
FIG. 3 depicts a block diagram of an example configuration for identifying related information in dissimilar data in accordance with an illustrative embodiment.

With reference to FIG. 3, this figure depicts a block diagram of an example configuration for identifying related information in dissimilar data in accordance with an illustrative embodiment. Application 302 is an example of application 115 in FIG. 1. Data 304 is an example of data 117 in FIG. 1. Schema 306 is an example of schema 111 in FIG. 1. Dictionary 308 is an example of dictionary 105 in FIG. 1. Database 310 is an example of database 109 in FIG. 1.

Component 312 manages dictionary 308. In one embodiment component 312 creates dictionary 308, such as by creating an initial set of key entries with their corresponding normalized forms, types, or a combination thereof. In another embodiment component 312 manipulates dictionary 308, such as by adding, deleting, changing, augmenting, or otherwise modifying key entries in dictionary 308.

Data annotation component 314 identifies in data 304 descriptions, words, phrases, content, or portions thereof, which match within a tolerance one or more keys in one or more entries of dictionary 308. A tolerance for matching a description, word, phrase, content, or a portion thereof with a key can be defined in many ways, including but not limited to accepting different grammatical forms or synonyms as matching, accepting phrases conveying similar meanings as matching, accepting words in different languages as matching, accepting entire strings as matching when only some portions of the strings match, and so on. For example, if a key includes "fracking", an embodiment regards a sentence in a volume that pertains to "hydraulic fracturing" or "shale extraction" as matching the key. Accordingly, component 314 identifies such sentences as matching a key within a tolerance.

Component 316 constructs a query using one or more normalized forms, one or more types, or some combination thereof, which correspond to the one or more keys that component 314 has matched with some description, word, phrase, content, or a portion thereof in data 304. The query from component 316 follows a query specification of database 310. In other words, component 316 constructs the query according to schema 306 of database 310 and by using a query language supported by database 310.

Component 318 presents the query constructed by component 316 for execution on database 310. Component 318 receives the result set from the execution of the query on database 310. Component 318 presents the result set as report 320.

With reference to FIG. 4, this figure depicts an example of a volume of data and annotation therein in accordance with an illustrative embodiment. Data 400 is an example of data 304 in FIG. 3.

An embodiment, such as an embodiment implemented in application 302 in FIG. 3, annotates description, word, phrase, content, or a portion thereof in data 400 depending on finding a match within a tolerance with one or more keys in a dictionary, such as in dictionary 308 in FIG. 3. For example, based on some example keys depicted in FIG. 5 and other keys, the application annotates certain words, strings, phrases, or portions or combinations thereof as annotations 402, 404, 406, 408, 410, 412, and 414. For example, annotation 402 contains the word "Arabian", which matches within a tolerance with a key, and the word "Basin" which matches within the tolerance with another key. Similarly, annotation 404 matches another key within the tolerance.

The application further determines that the numeric data of annotation 406 is followed by a unit of measure, to wit, "ft". According to a regular expression analysis, the application determines that annotation 406 contains a measurement.

Earlier in that sentence, the application also found the word "depth" (406A), which provides the context for the measurement according to the grammar of the language of the sentence. Accordingly, the application concludes that annotation 406 is a measurement of depth. Such grammatical analysis for the context can be performed in any known technique, including but not limited to natural language processing (NLP).

Similarly, annotation 408 contains the words "Continental rift", all or parts of which match one or more keys within the tolerance. Annotations 410 and 412 similarly contain the words "Passive margin" and "foreland basins", respectively, all or parts of which match one or more keys within the tolerance. Similarly, annotation 414 contains the words "rift basins", all or parts of which match one or more keys within the tolerance.

Figure 5:
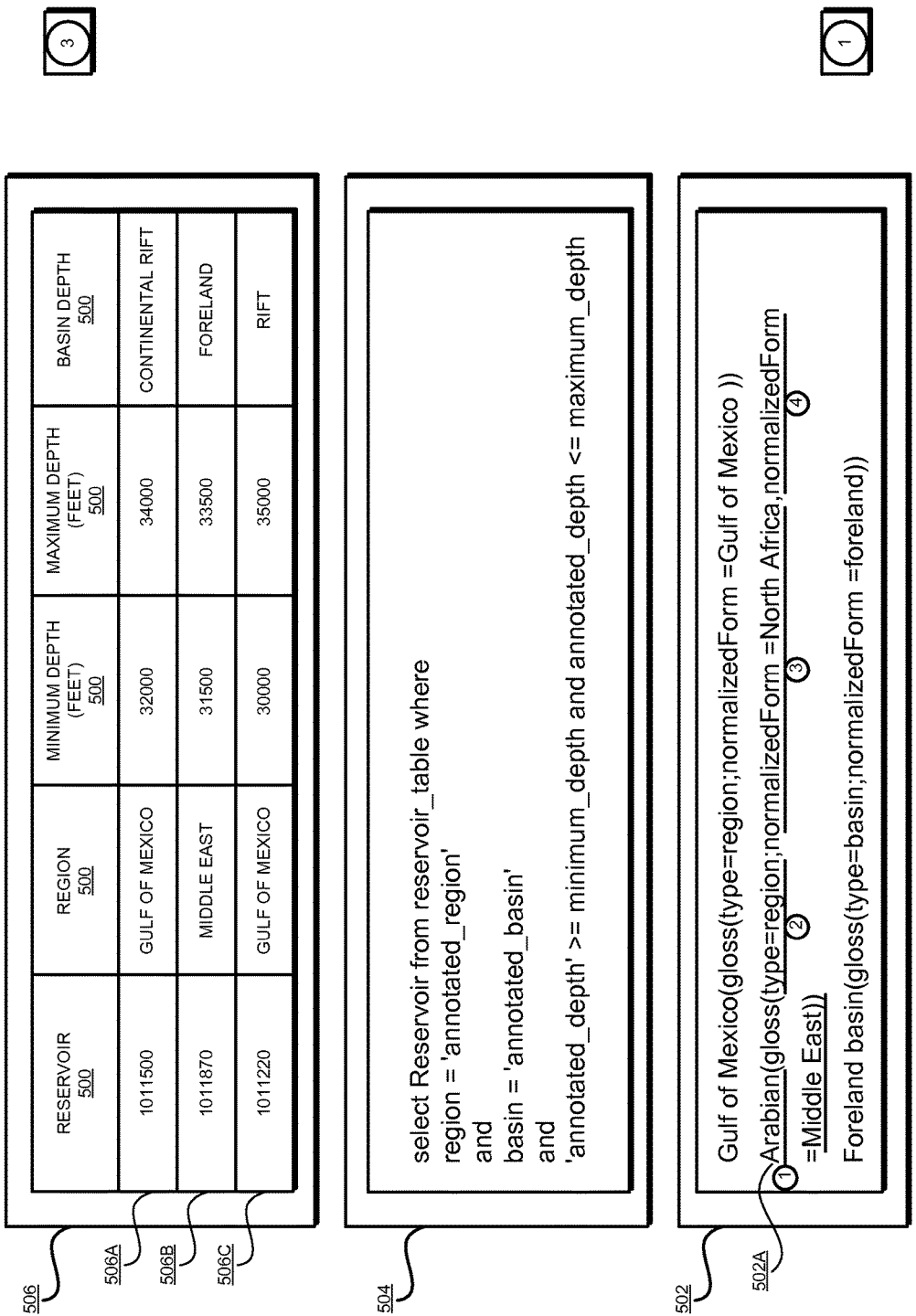
FIG. 5 depicts example keys, query, and result set for identifying related information in dissimilar data in accordance with an illustrative embodiment.

Once the annotations are matched with certain keys, the application constructs a query using the normalized forms, types, or a combination thereof from those keys as described elsewhere in this disclosure. The application then obtains a result set responsive to the query as described elsewhere in this disclosure. FIG. 5 depicts examples of the keys, the query, and the result set related to example annotated data 400.

With reference to FIG. 5, this figure depicts example keys, query, and result set for identifying related information in dissimilar data in accordance with an illustrative embodiment. Keys 502 can be used with data 400 in FIG. 4. Query 504 is constructed using certain annotations in data 400 in FIG. 4. The records in result set 506 are returned by executing query 504 on database 310 in FIG. 3.

Consider example key entry 502A in keys 502. Portion 1 of key entry 502A contains the word "Arabian". Portion 1 of key entry 502A is regarded as a token and is used to identify matching description, word, phrase, content, or a portion thereof for annotating, such as to identify annotation 402 in FIG. 4.

Portions 2, 3, and 4 together form the information associated with the token in portion 1 for key entry 502A. For example, portion 2 identifies a type associated with the token "Arabian". In this example, the type of the token is a "region". In other words, information of a type similar to the type of the token in portion 1 will be found in a column that has a column name "region" in the schema of the database that serves as the repository of information that is to be related with data 400.

Portions 3 and 4 identify more than one alternative normalized forms associated with the token "Arabian". In this example, the normalized forms of the token are "North Africa" according to portion 3 or "Middle East" according to portion 4. In other words, a related record will include data from a row containing the data "North Africa" or data "Middle East" in a column that has a column name "region" in the schema of the database.

As can be seen in other key entries in key entries 502, some key entries can have one or more normalized forms corresponding to a token. When more than one normalized forms are provided in a key entry, those normalized forms are the possible alternative normalized forms for the token of the key entry. Similarly, some tokens can have one or more types (not shown) corresponding to a token. When such a situation arises, separate key entries can be created for each alternative type, each separate key entry having one type, and one or more normalized forms.

Query 504 is a simple example query constructed by application 302 by applying key entries 502 and other key entries not shown, and regular expression analysis of data 400 of FIG. 4. For example, the query seeks to identify (select) the information of those reservoirs (from a reservoir table in the entity's database or repository of information), which are in the region of annotations 402 (Arabian) or 404 (Gulf of Mexico) and basin of annotation 402 (Basin) or 412 (foreland basins) or 414 (rift basin), whose minimum depth is less than or equal to the depth measurement of annotation 406 (32,808 ft, context "depth" 406A) and whose maximum depth is greater than or equal to the depth measurement of annotation 406 (32808 ft, context "depth" 406A).

Result set 506 is an example presentation of example records returned by the entity's database in response to query 504. For example, record 506A identifies a reservoir known in the entity's repository of information as reservoir 1011500. Reservoir 1011500 matches the description in data 400 because that reservoir lies in the region of Gulf of Mexico that is a normalized form of annotation 404 in data 400, has a minimum depth of 32000 ft that is less than depth 32808 ft provided in data 400, and has a maximum depth of 34000 ft that is greater than depth 32808 ft provided in data 400. Additionally, record 506A provides that reservoir 1011500 is situated at a basin depth classified as "continental rift" according to annotation 408.

Similarly, record 506B identifies a reservoir known in the entity's repository of information as reservoir 1011870. Reservoir 1011870 matches the description in data 400 because that reservoir lies in the region of Middle East that is a normalized form of annotation 402 in data 400, has a minimum depth of 31500 ft that is less than depth 32808 ft provided in data 400, and has a maximum depth of 33500 ft that is greater than depth 32808 ft provided in data 400. Additionally, record 506B provides that reservoir 1011870 is situated at a basin depth classified as "foreland" according to annotation 412.

Similarly, record 506C identifies a reservoir known in the entity's repository of information as reservoir 1011220. Reservoir 1011220 matches the description in data 400 because that reservoir lies in the region of Gulf of Mexico that is a normalized form of annotation 404 in data 400, has a minimum depth of 30000 ft that is less than depth 32808 ft provided in data 400, and has a maximum depth of 35000 ft that is greater than depth 32808 ft provided in data 400. Additionally, record 506C provides that reservoir 1011220 is situated at a basin depth classified as "rift" according to annotations 408, 412, and 414.

For the clarity of the depictions and the descriptions, not all annotations are depicted in FIG. 4, not all key entries applicable to data 400 are shown in FIG. 5, and not all parts of query 504 are shown in FIG. 5. Furthermore, result set 506 can include more of less records than depicted in FIG. 5 depending upon the information available in the entity's repository. As can be seen from the example depictions and descriptions though, records 506A-C could not have been automatically identified from the repository without the novel steps of an embodiment. Not only would such identification require great human effort even with such limited example data, but such effort would also be error prone. Such human effort would be prohibitive or impractical with comparatively more data in the volume and more information in the repository.

Figure 6:
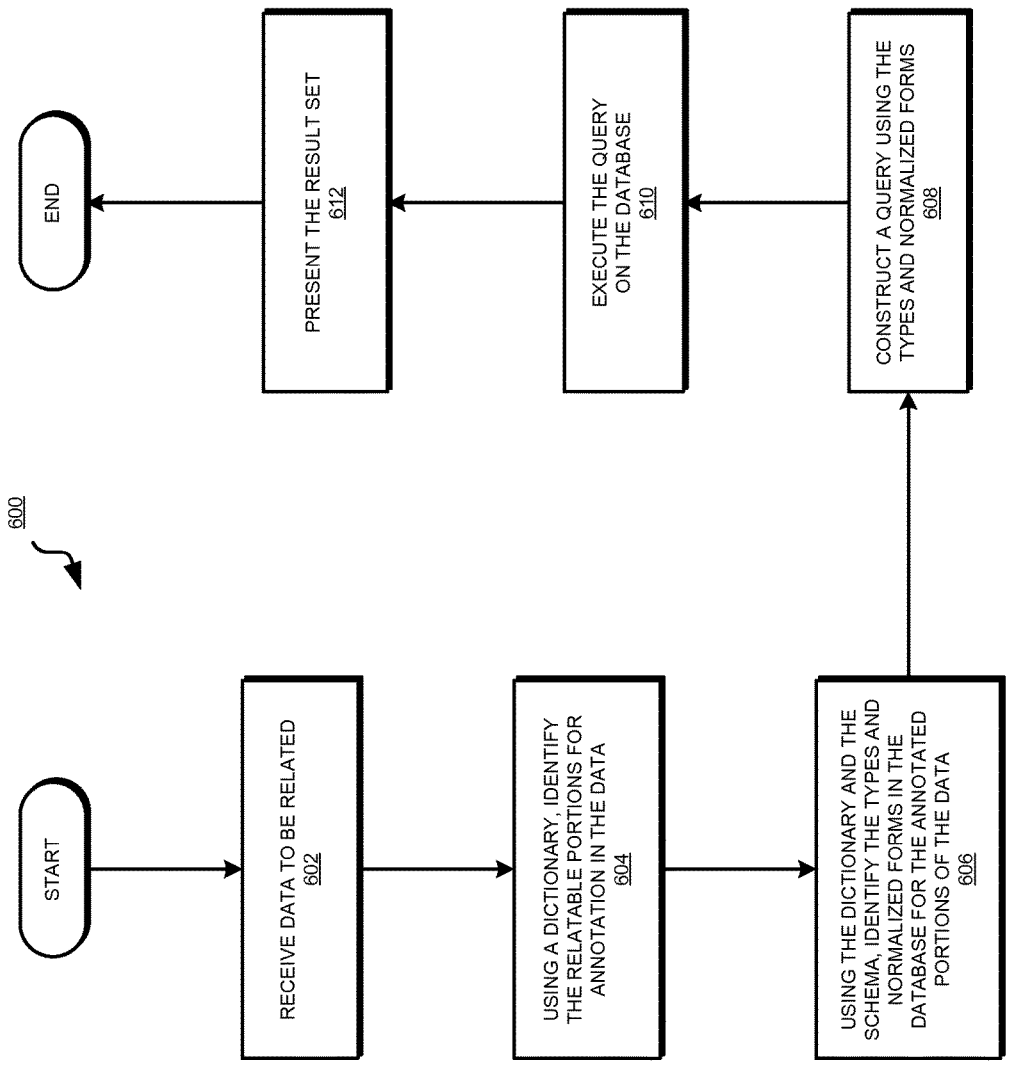
FIG. 6 depicts a flowchart of an example process for identifying related information in dissimilar data in accordance with an illustrative embodiment.

With reference to FIG. 6, this figure depicts a flowchart of an example process for identifying related information in dissimilar data in accordance with an illustrative embodiment. Process 600 can be implemented in application 302 in FIG. 3.

The application receives data, such as data 400 in FIG. 4, that is to be related to information in a user's repository, such as database 310 in FIG. 3 (block 602). The application, using a dictionary such as dictionary 308 in FIG. 3, identifies relatable portions for annotation in the data (block 604).

The application, using the dictionary and the schema, identifies the types and normalized forms of the annotations in the data (block 606). The application constructs a query using the identified types and normalized forms (block 608).

The application executes the query or causes the query to be executed on the repository (block 610). The application presents the result set obtained from executing the query (block 612). The application ends process 600 thereafter.

Thus, a computer implemented method, system or apparatus, and computer program product are provided in the illustrative embodiments for identifying related information in dissimilar data. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying related information in dissimilar data, the method comprising:

identifying, by a client device, using a first part of a first entry in a dictionary, a first portion in a first data, the first part matching the first portion within a tolerance;

determining a second part of the first entry in the dictionary, the second part referencing a section of a second data, the second data being organized in a repository according to a schema, wherein the second part comprises a type of information in the first part;

determining a third part of the first entry in the dictionary, the third part being sufficient to locate a record in the section of the second data, the third part including a normalized form of a concept represented in the first part, and wherein the third part comprises an alternate form of the first part, the repository using the alternate form of the first part to represent information of a type according to the second part;

constructing a query using the second part and the third part;

obtaining, responsive to performing the query on the second data, a result set, wherein a record in the result set is related to the first portion in the first data and the record does not include the first portion, wherein the record includes record data from a row containing the third part in a column identified by the second part;

creating a set of entries in the repository, the set of entries including the first entry, wherein the set of entries is created based on a third data;

adding a second entry to the set of entries, a second part of the second entry referencing a second section of the second data based on the first portion of the first data; and modifying the second entry in the set of entries, wherein the modifying adds a fourth part to the second entry based on the first portion of the first data such that the fourth part is sufficient to locate a different record in the section of the second data.

2. The method of claim 1, wherein the tolerance allows accepting a first grammatical form of a phrase in the first part as matching a second grammatical form of the phrase in the first portion.

3. The method of claim 1, wherein the tolerance allows accepting a first phrase in the first part as matching a second phrase in the first portion when the first phrase and the second phrase are distinct but convey the same meaning.

4. The method of claim 1, wherein the tolerance allows accepting a first string in the first part as matching a second string in the first portion when only a fraction of the first string matches a fraction of the second string.

5. The method of claim 1, wherein the repository is a database, the schema is a schema of the database, and the section of the second data is a column in a table in the database.

6. The method of claim 1, wherein the repository is a database, the schema is a schema of the database, the section of the second data is a column in a table in the database, and the third part is a data item in a row under the column.

7. The method of claim 1, wherein the method is embodied in a computer program product comprising one or more computer-readable tangible storage devices and computer-readable program instructions which are stored on the one or more computer-readable tangible storage devices and executed by one or more processors.

8. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

9. A computer program product for identifying related information in dissimilar data, the computer program product comprising:

one or more computer-readable tangible storage devices;

program instructions, stored on at least one of the one or more storage devices, to identify, by a client device, using a first part of a first entry in a dictionary, a first portion in a first data, the first part matching the first portion within a tolerance;

program instructions, stored on at least one of the one or more storage devices, to determine a second part of the first entry in the dictionary, the second part referencing a section of a second data, the second data being organized in a repository according to a schema, wherein the second part comprises a type of information in the first part;

program instructions, stored on at least one of the one or more storage devices, to determine a third part of the first entry in the dictionary, the third part being sufficient to locate a record in the section of the second data, the third part including a normalized form of a concept represented in the first part, and wherein the third part comprises an alternate form of the first part, the repository using the alternate form of the first part to represent information of a type according to the second part;

program instructions, stored on at least one of the one or more storage devices, to construct a query using the second part and the third part;

program instructions, stored on at least one of the one or more storage devices, to obtain, responsive to performing the query on the second data, a result set, wherein a record in the result set is related to the first portion in the first data and the record does not include the first portion, wherein the record includes record data from a row containing the third part in a column identified by the second part;

program instructions, stored on at least one of the one or more storage devices, to create a set of entries in the repository, the set of entries including the first entry, wherein the set of entries is created based on a third data;

program instructions, stored on at least one of the one or more storage devices, to add a second entry to the set of entries, a second part of the second entry referencing a second section of the second data based on the first portion of the first data; and program instructions, stored on at least one of the one or more storage devices, to modify the second entry in the set of entries, wherein the modifying adds a fourth part to the second entry based on the first portion of the first data such that the fourth part is sufficient to locate a different record in the section of the second data.

10. The computer program product of claim 9, wherein the tolerance allows accepting a first grammatical form of a phrase in the first part as matching a second grammatical form of the phrase in the first portion.

11. The computer program product of claim 9, wherein the tolerance allows accepting a first phrase in the first part as matching a second phrase in the first portion when the first phrase and the second phrase are distinct but convey the same meaning.

12. A computer system for identifying related information in dissimilar data, the computer system comprising:

one or more processors, one or more computer-readable memories and one or more computer-readable storage devices;

program instructions, stored on at least one of the one or more storage devices for execution by at least one of the one or more processors via at least one of the one or more memories, to identify, by a client device, using a first part of a first entry in a dictionary, a first portion in a first data, the first part matching the first portion within a tolerance;

program instructions, stored on at least one of the one or more storage devices for execution by at least one of the one or more processors via at least one of the one or more memories, to determine a second part of the first entry in the dictionary, the second part referencing a section of a second data, the second data being organized in a repository according to a schema, wherein the second part comprises a type of information in the first part;

program instructions, stored on at least one of the one or more storage devices for execution by at least one of the one or more processors via at least one of the one or more memories, to determine a third part of the first entry in the dictionary, the third part being sufficient to locate a record in the section of the second data, the third part including a normalized form of a concept represented in the first part, and wherein the third part comprises an alternate form of the first part, the repository using the alternate form of the first part to represent information of a type according to the second part;

program instructions, stored on at least one of the one or more storage devices for execution by at least one of the one or more processors via at least one of the one or more memories, to construct a query using the second part and the third part; and program instructions, stored on at least one of the one or more storage devices for execution by at least one of the one or more processors via at least one of the one or more memories, to obtain, responsive to performing the query on the second data, a result set, wherein a record in the result set is related to the first portion in the first data and the record does not include the first portion, wherein the record includes record data from a row containing the third part in a column identified by the second part;

program instructions, stored on at least one of the one or more storage devices for execution by at least one of the one or more processors via at least one of the one or more memories, to create a set of entries in the repository, the set of entries including the first entry, wherein the set of entries is created based on a third data;

program instructions, stored on at least one of the one or more storage devices for execution by at least one of the one or more processors via at least one of the one or more memories, to add a second entry to the set of entries, a second part of the second entry referencing a second section of the second data based on the first portion of the first data; and program instructions, stored on at least one of the one or more storage devices for execution by at least one of the one or more processors via at least one of the one or more memories, to modify the second entry in the set of entries, wherein the modifying adds a fourth part to the second entry based on the first portion of the first data such that the fourth part is sufficient to locate a different record in the section of the second data.

* * * * *